United States Patent [19]

Maxwell

[11] Patent Number: 4,821,771
[45] Date of Patent: Apr. 18, 1989

[54] DIVERTER VALVE WITH BELLOWS SEAL

[75] Inventor: Ronald K. Maxwell, Irving, Tex.

[73] Assignee: Pathway Bellows, Inc., El Cajon, Calif.

[21] Appl. No.: 11,643

[22] Filed: Feb. 6, 1987

[51] Int. Cl.$^4$ .................... F16K 11/02; F16K 25/00
[52] U.S. Cl. .................... 137/625.44; 251/174; 251/177; 137/875
[58] Field of Search ............ 251/170, 171, 174, 177, 251/178, 179, 298, 359; 137/862, 875, 625.44; 277/212 R, 212 FB

[56] References Cited

U.S. PATENT DOCUMENTS

| | | | |
|---|---|---|---|
| 2,398,461 | 4/1946 | Rider | 137/875 X |
| 3,805,884 | 4/1974 | Burt et al. | 137/875 X |
| 4,585,026 | 4/1986 | Norton | 251/298 X |
| 4,706,706 | 11/1987 | Page et al. | 251/175 X |

FOREIGN PATENT DOCUMENTS 73739 12/1953 Netherlands ............ 251/177

Primary Examiner—A. Michael Chambers
Assistant Examiner—John C. Fox
Attorney, Agent, or Firm—Lane and Aitken

[57] ABSTRACT

A diverter valve for diverting the flow of hot gases has a valve door pivotable between two outlets, each of which is surrounded by a bellows seal having a sidewall of significant width for continuous with the valve door and defining with the door a seal of large area. The sidewall is flat and uninterrupted, and the bellows can be made in various shapes, including circular, rectangular with rounded corners, and rectangular with mitered corners.

9 Claims, 2 Drawing Sheets

DIVERTER VALVE WITH BELLOWS SEAL

BACKGROUND OF THE INVENTION

This invention relates to seals for preventing the escape of gas around a valve door in a diverter valve used to divert gas flow in a duct.

In ducts used to direct the flow of gases, such as turbulent, high temperature waste gas from a gas turbine, a diverter valve having a body with at least three openings for connection to gas conduits includes a door which pivots to alternately block flow through one of two of the openings. A typical diverter valve can include one opening used as an inlet for hot gases, two openings used as outlets, and a door pivotable between a first position closing one of the outlets and a second position closing the other outlet. In such an arrangement, it is important to provide seals between the valve body and the door to prevent the leakage of the gas through the closed outlet. In prior art diverter valves, seals have been provided in the form of leaf seal members which allow an unacceptable amount of leakage. In order to prevent the escape of gas around the door of a diverter valve, a plurality of leaf seal members must together define a closed figure such as a rectangle. However, the leaf seal members forming the individual sides of the rectangle cannot be joined to one another since they will move closer to one another or farther from one another at their juncture as they are deflected by the door. The inability of the leaf members to be joined means that overlaps or gaps at the junctures are present, which results in leakage past the seal at the junctures.

SUMMARY OF THE INVENTION

The present invention provides a seal for a diverter valve door which substantially eliminates leakage. In accordance with the invention, the seal is in the form of a multi-convoluted bellows of resilient sheet metal positioned in a channel surrounding each outlet. Walls of the channel protect the seal from turbulent gas flows in the diverter valve, which can set up destructive vibrations in the seal. The bellows seal is defined by one or more bellows seal sections projecting beyond the top of the channel to engage a side of the diverter valve door facing the outlet. Bellows seal sections can be butted and joined around a periphery to define a continuous sealing surface uninterrupted by any gaps or overlaps. Accordingly, the bellows seal can engage the door with a continuous contact around the periphery. In addition, the bellows of the bellows seal includes a plurality of curved portions providing a high spring force in the seals to ensure tight contact of the seals against the door. Furthermore, bellows-shaped seal members can employ thicker materials allowing seals to resist corrosion.

BRIEF DESCRIPTION OF THE DRAWINGS

FIG. 5 is a side view of an alternate bellows seal for the rectangular outlet of FIG. 1.

DESCRIPTION OF THE PREFERRED EMBODIMENT

Figure 1:
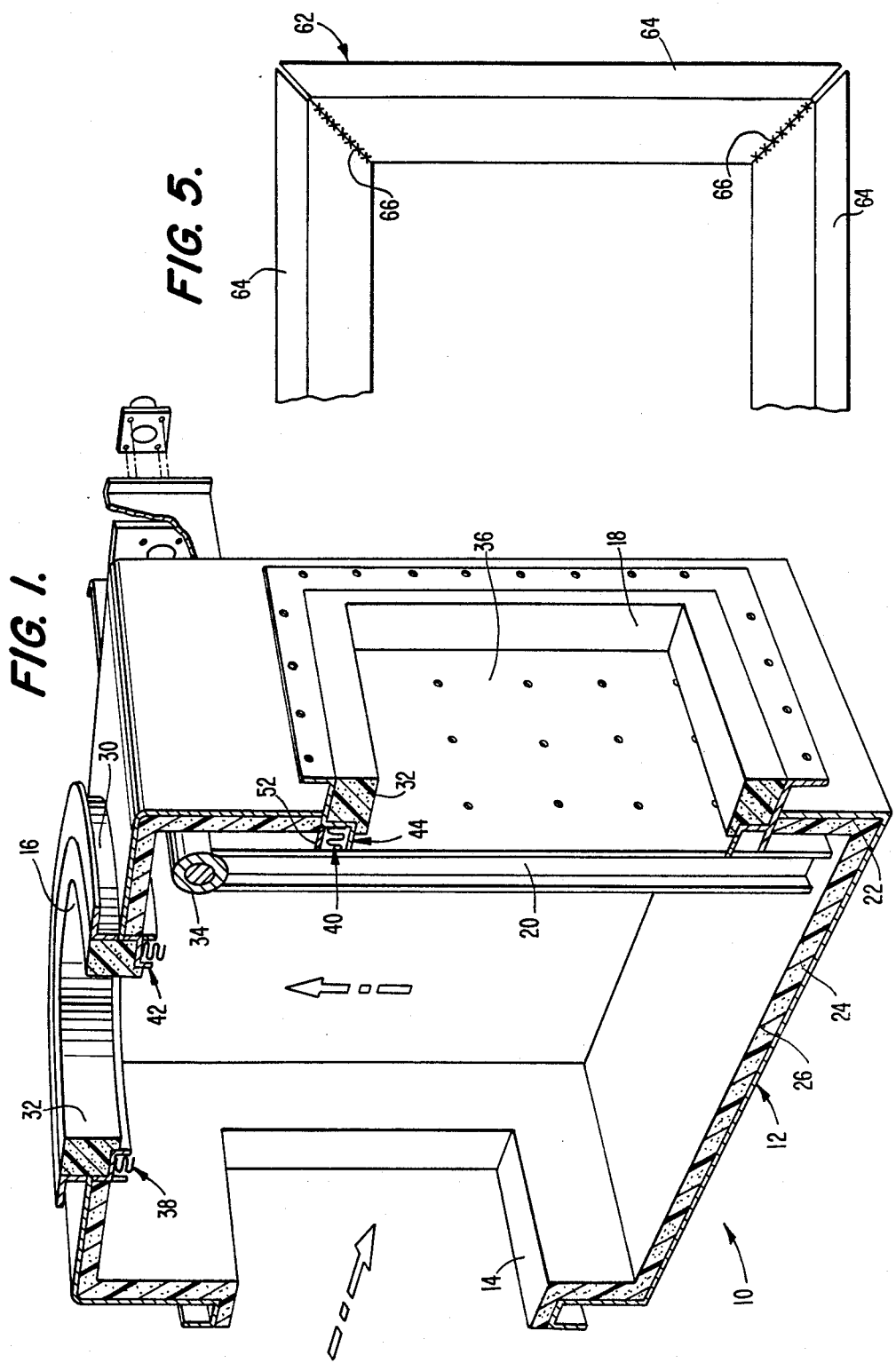
FIG. 1 is a perspective view in cross section of a diverter valve according to the present invention.
Figure 2:
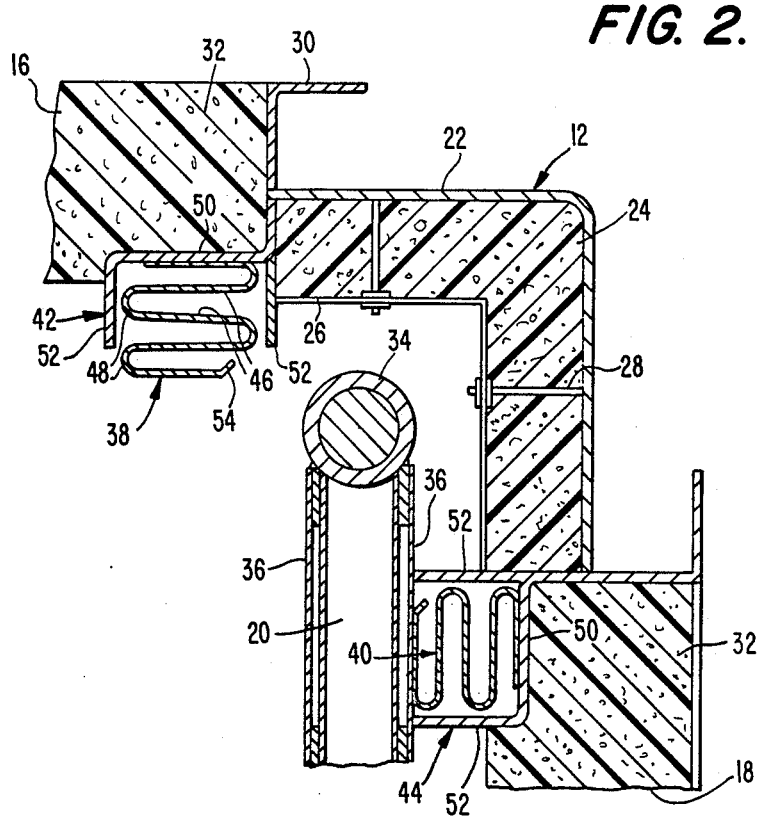
FIG. 2 is an enlarged side view of a portion of the cross section of FIG. 1.

As shown in FIGS. 1 and 2, the diverter valve according to the present invention, which is designated generally by the reference numeral 10, includes a valve body 12 having an inlet 14 and two outlets 16 and 18, and a pivotally mounted valve element in the form of a door 20 for blocking the flow of gas through either one of the outlets. The valve body 12 typically comprises an external steel wall 22, or frame skin, to which a layer of insulation 24 is secured by a liner 26, the liner being connected to the wall 22 by studs 28 (FIG. 2). The inlet 14 and the outlets 16 and 18 are defined by structural elements, such as angle members 30, which are welded to the wall 22 of the diverter valve body 12 around the openings formed therein, and additional insulation 32 is secured to the structural members within the inlet 14 and the outlets 16 and 18.

The door 20 for diverting flow of hot gases to the outlets 16 and 18 is pivotally supported on a shaft 34 positioned between the two outlet openings. The shaft 34 extends beyond the valve body 12 for connection to an actuator (not shown), which can be, for example, an electric, hydraulic or pneumatic motor for pivoting the door 20 between a position in which the door closes off the outlet 18, as shown, and a position in which the door closes off the outlet 16. The door 20 has opposite panels 36, each of which has a sealing surface and an area greater than the area of the outlet 16 or 18 which the panel 36 closes.

In order to prevent the escape of gas around the door 20 when it closes one of the outlets 16 or 18, seals 38 and 40 in the form of bellows of resilient material, such as spring steel, are provided around the periphery of the outlets. The bellows seals 38 and 40 are mounted in channels 42 and 44 extending around the periphery of the outlets, 16 and 18, respectively, the top of each channel 42 and 44 opening toward the interior of the diverter valve body 12 and toward the door 20 when the door 20 closes the outlet 16 or 18 associated with the channel 42 or 44. Each bellows seal 38 and 40 includes a plurality of convolutions having wide side walls 46 extending between curved connecting portions 48 of a small radius, as shown in FIG. 2. Each bellows seal 38 and 40 includes a first terminal sidewall 46 secured to a bottom 50 of its channel 42 or 44 by, for example, welding or fasteners and a second terminal sidewall 46 projecting above sides 52 of the channel and having a flange 54 turned back toward the bellows. The second terminal sidewalls 46 of the bellows seals 38 and 40 contact the panels 36 of the door 20 over an area having a width substantially equal to the distance between one curved connecting portion 48 and the next curved connecting portion. The door 20 compresses the seal 38 or 40 until the door 20 engages the tops of the sides 52 of the channel 42 or 44, at which point the seal 38 or 40 is substantially isolated from gas flows in the valve 10.

Figure 3:
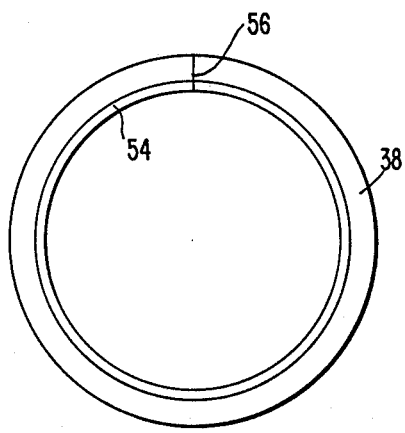
FIG. 3 is a bottom plan view of the bellows seal around the circular outlet of FIG. 1.
Figure 4:
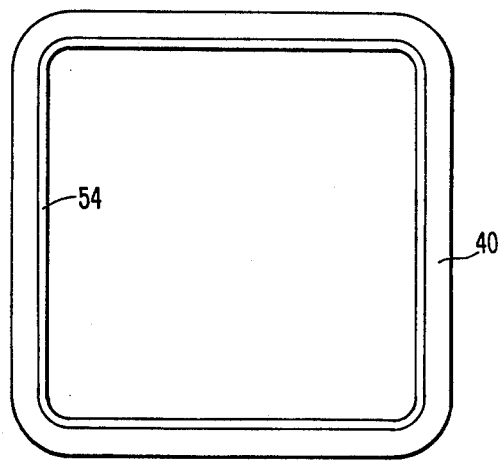
FIG. 4 is a side view of the bellows seal around the rectangular outlet of FIG. 1.

As can best be seen from FIGS. 3 and 4, the bellows seals 38 and 40 define a closed outline uninterrupted by gaps or overlaps and, therefore, by their engagement with the panels 36 of the door 20 prevent any of the hot gases from passing through the closed outline and through the outlet closed off by the door 20. The outlet 16 is circular, and so the bellows seal 38, shown in FIG. 3, is circular to conform to the shape of the outlet 16. To make the bellows seal 38, a flat strip of sheet metal is rolled into a circular cylinder and the ends are butt welded together, as is indicated at 56. Convolutions are then punched, rolled or hydroformed radially to define the circular bellows seal 38.

The outlet 18 is rectangular, and so the bellows seal 40, shown in FIG. 4, is rectangular and has rounded corners 58. The process used to form the circular bellows seal 38 of FIG. 3 can also be used to make the rectangular seal 40 having the rounded corners 58. In such a case, the radius of the circular cylinder is chosen to equal the desired radius of curvature of the rounded corners 58. The completed circular seal is cut into four 90 degree pieces to define the rounded corners 58, and straight bellows seal sections 60 are interconnected with the rounded corners 58 by butt welding to form the rectangular bellows seal 40. The straight bellows seal sections 60 are strips of metal in which convolutions are formed in a manner similar to that of the circular cylinder.

Instead of forming a rectangular bellows seal with rounded corners, as in the seal 40, the rectangular bellows seal can be formed with square corners, as is shown by the bellows seal 62 in FIG. 5. In that case, flat pieces of sheet metal are break formed or roll formed into convolutions to provide the linear sides 64 of the bellows seal 62. These linear sides 64 are mitered at their ends at 45 degrees, and the ends are welded together by positioning the mitered ends adjacent one another, leaving a gap of 1/32 to 1/64 of an inch, and filling the gap with welding filler material 66. All but one half inch of the mitered joint at the outer tip of the seal on the side where it engages the door 20 is welded together in this manner. This joint structure enables the bellows seal 62 to retain its shape when the materials at the mitered joints shrink upon cooling after welding.

Thus, it will be appreciated that problems associated with seals in previous diverter valves have been overcome, and it is contemplated that variations and/or changes in the embodiment of the invention illustrated and described herein may be made without departing from the present invention. Accordingly, it is intended that the foregoing description is illustrative only, not limiting, and that the true spirit and scope of the present invention are determined by the appended claims.

What is claimed is:

1. A diverter valve for directing the flow of gas to selected paths comprising:
 a valve body;
 an inlet and a plurality of outlets in said valve body;
 a valve element in said valve body, said valve element being mounted for movement between a first position in which said valve element closes a first of said outlets and a second position in which said valve element closes a second of said outlets;
 a seal surrounding each of said first and second outlets, each seal defining a resilient bellows having at least one convolution, wherein each convolution includes a curved end portion and a flat sidewall uninterrupted around its respective outlet and having a predetermined width, said flat sidewall of the seal surrounding the outlet closed by said valve element and being in continuous contact with said valve element over substantially said width in order to prevent the flow of gas past said valve element.

2. The diverter valve of claim 1, wherein said valve element is a door having first and second opposed sealing surfaces, said door being mounted for pivoting around a pivot axis between said first position, in which said door closes said first outlet, and said second position, in which said door closes said second outlet.

3. The diverter valve of claim 1, wherein said bellows is made of a resilient material.

4. The diverter valve of claim 1, wherein said first sealing surface compresses the resilient bellows surrounding said first outlet when said valve door closes said first outlet, and said second sealing surface compresses the resilient bellows surrounding said second outlet when said valve door closes said second outlet.

5. The diverter valve of claim 1, wherein a channel surrounds each of said first and second outlets, each said channel having a top opening toward said valve door when said valve door closes the outlet associated with said channel, each said seal being positioned in a said channel and protruding beyond said top of said channel to engage said valve door.

6. The diverter valve of claim 1, wherein at least one of said seals has the shape of a rectangle having rounded corners.

7. The diverter valve of claim 6, wherein said at least one seal includes straight side sections and rounded corner sections, said sections being secured to one another to define said rectangle.

8. The diverter valve of claim 1, wherein at least one of said seals is circular.

9. The diverter valve of claim 1, wherein at least one of said seals is rectangular, said rectangle comprising side sections having mitered ends, said mitered ends being joined together.

* * * * *